(12) United States Patent
Silverstein

(10) Patent No.: US 8,651,663 B2
(45) Date of Patent: Feb. 18, 2014

(54) STEREOSCOPIC PROJECTOR USING SCROLLING COLOR BANDS

(75) Inventor: Barry David Silverstein, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 283 days.

(21) Appl. No.: 13/251,472

(22) Filed: Oct. 3, 2011

(65) Prior Publication Data
US 2013/0083292 A1    Apr. 4, 2013

(51) Int. Cl.
    *G03B 21/00*     (2006.01)
    *G03B 21/28*     (2006.01)
    *G02F 1/00*     (2006.01)
    *H04N 13/04*     (2006.01)
    *G02B 27/22*     (2006.01)
    *G06T 15/00*     (2011.01)

(52) U.S. Cl.
USPC .............. 353/7; 353/31; 353/81; 348/750; 348/51; 359/462; 345/419

(58) Field of Classification Search
USPC ............... 353/7, 31, 81; 348/750, 42, 51; 359/464, 462; 345/419
See application file for complete search history.

(56) References Cited

U.S. PATENT DOCUMENTS

| | | | |
|---|---|---|---|
| 6,283,597 B1 | 9/2001 | Jorke | |
| 6,793,341 B2 | 9/2004 | Svardal et al. | |
| 6,967,778 B1 | 11/2005 | Wheatley et al. | |
| 7,147,332 B2 | 12/2006 | Conner | |
| 7,832,869 B2 | 11/2010 | Maximus et al. | |
| 7,891,816 B2 | 2/2011 | Silverstein et al. | |
| 7,959,295 B2 | 6/2011 | Richards et al. | |
| 8,016,422 B2 | 9/2011 | Silverstein et al. | |
| 2006/0017891 A1 | 1/2006 | Conner | |
| 2007/0247709 A1 | 10/2007 | Karakawa | |
| 2008/0151193 A1 | 6/2008 | Reder | |
| 2009/0153752 A1 | 6/2009 | Silverstein | |
| 2011/0063726 A1 | 3/2011 | Ramstad | |
| 2011/0205494 A1* | 8/2011 | Richards et al. | 353/7 |

FOREIGN PATENT DOCUMENTS

| | | |
|---|---|---|
| DE | 198 08 264 | 11/1998 |
| JP | 2003-186112 | 7/2003 |

* cited by examiner

*Primary Examiner* — Tony Ko
*Assistant Examiner* — Magda Cruz
(74) *Attorney, Agent, or Firm* — Kevin E. Spaulding

(57) ABSTRACT

A color stereoscopic digital projection system having a plurality of color channels for projecting a color stereoscopic image, comprising: left-eye and right-eye image forming systems, each including a light sources for each color channel; a spatial light modulator, illumination optics arranged to receive the light beams and provide corresponding substantially uniform bands of light, beam scanning optics arranged to cyclically scroll the bands of light across the spatial light modulator, and a controller system that synchronously modulates the pixels of the spatial light modulator according to image data. The right-eye and left-eye light sources have corresponding spectrally-adjacent, substantially non-overlapping spectral bands falling within the same component color spectrum. The system also includes one or more dichroic filters for combining the imaging light arranged to selectively transmit the spectral bands from one of the image forming systems and selectively reflect the spectral bands from the other image forming system.

20 Claims, 16 Drawing Sheets

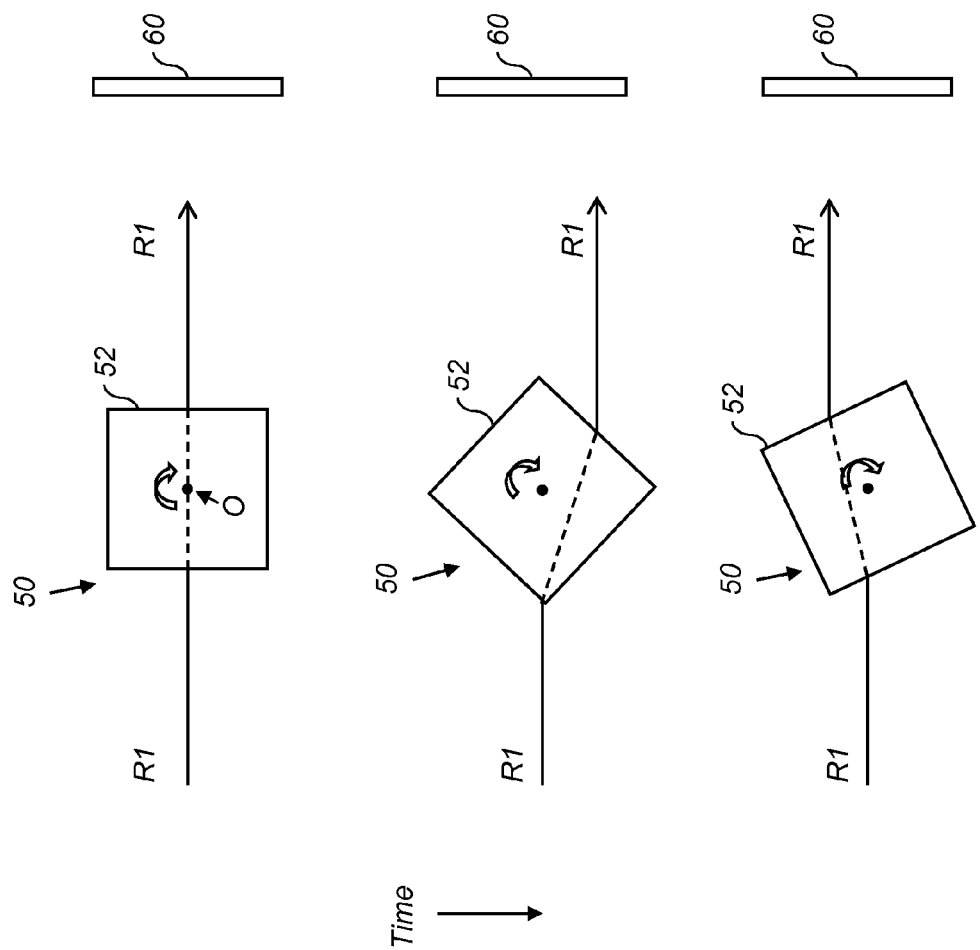

STEREOSCOPIC PROJECTOR USING SCROLLING COLOR BANDS

CROSS-REFERENCE TO RELATED APPLICATIONS

Reference is made to commonly assigned, co-pending U.S. patent application Ser. No. 13/251,456, entitled: "Stereoscopic projector using spectrally-adjacent color bands", by Silverstein et al., which is incorporated herein by reference.

FIELD OF THE INVENTION

This invention generally relates to an apparatus for projecting a stereoscopic digital image and more particularly relates to an improved apparatus using scrolling spectrally-adjacent color bands for forming the separate left- and right-eye images

BACKGROUND OF THE INVENTION

In order to be considered as suitable replacements for conventional film projectors, digital projection systems must meet demanding requirements for image quality. This is particularly true for multicolor cinematic projection systems. Competitive digital projection alternatives to conventional cinematic-quality projectors must meet high standards of performance, providing high resolution, wide color gamut, high brightness, and frame-sequential contrast ratios exceeding 2,000:1.

Stereoscopic projection is a growing area of special interest for the motion picture industry. Three-dimensional (3-D) images or perceived stereoscopic content offer consumers an enhanced visual experience, particularly in large venues. Conventional stereoscopic systems have been implemented using film, in which two sets of films and projectors simultaneously project orthogonal polarizations, one for each eye, termed a "left-eye image" and a "right-eye image" in the context of the present disclosure. Audience members wear corresponding orthogonally polarized glasses that block one polarized light image for each eye while transmitting the orthogonal polarized light image.

In the ongoing transition of the motion picture industry to digital imaging, some vendors, such as Imax, have continued to utilize a two-projection system to provide a high quality stereo image. More recently, however, conventional digital projectors have been modified to enable 3D projection.

Conventional methods for forming stereoscopic images from these digital projectors have used one of two primary techniques for distinguishing left- and right-eye images. One technique, utilized by Dolby Laboratories, for example, uses spectral or color space separation. The method used is similar to that described in U.S. Pat. No. 7,832,869, entitled "Method and device for performing stereoscopic image display based on color selective filters" to Maximus et al., wherein color space separation is used to distinguish between the left-eye and right-eye image content. The image for each eye is projected using primary Red, Green, and Blue component colors, but the precise Red, Green, and Blue wavelengths that are used differ between left- and right-eye images. To achieve this separation, filters are utilized in the white light illumination system to momentarily block out portions of each of the primary colors for a portion of the frame time. For example, for the left eye, the lower wavelength spectrum of Red, Blue, and Green (RGB) would be blocked for a period of time. This would be followed by blocking the higher wavelength spectrum of Red, Blue, and Green (RGB) for the other eye. The appropriate color adjusted stereo content that is associated with each eye is presented to each spatial light modulator for the eye. The viewer wears viewing glasses with a corresponding filter set that similarly transmits only one of the two 3-color (RGB) spectral sets to each eye.

A second approach utilizes polarized light. One method disclosed in U.S. Pat. No. 6,793,341 to Svardal et al., utilizes each of two orthogonal polarization states delivered to two separate spatial light modulators. Polarized light from both modulators is then projected simultaneously. The viewer wears polarized glasses with polarization transmission axes for left and right eyes orthogonally oriented with respect to each other.

There are advantages and drawbacks with each approach. Spectral separation solutions, for example, are advantaged by being more readily usable with less expensive display screens. With spectral separation, polarization properties of the modulator or associated optics do not significantly affect performance. However, the needed filter glasses have been expensive and image quality is reduced by factors such as angular shift, head motion, and tilt. Expensive filter glasses are also subject to scratch damage and theft. Promising developments in filter glass design, including the use of layered optical films produced by non-evaporative means by 3M Corp, can help to address the cost problem and make spectral separation techniques more cost-effective.

Another drawback of the spectral separation approach relates to difficulties in adjustment of the color space and significant light loss due to filtering, leading to either a higher required lamp output or reduced image brightness. Filter losses have been addressed in U.S. Patent Application Publication 2009/0153752 to Silverstein, entitled "Projector using independent multiple wavelength light sources" wherein independent spectrally-adjacent sources are combined by a beamsplitter to be efficiently directed to a spatial light modulator. One disadvantage of this approach is that these light sources are only utilized approximately half of the time, as the modulator can only provide one eye image in time. While the light sources will likely have a longer life, the initial cost of the display is increase by the cost requirement of two sets of independent sources.

With polarization for separating the left- and right-eye images, light can be used more efficiently. U.S. Pat. No. 7,891,816 to Silverstein et al., entitled "Stereo projection using polarized solid state light sources," and U.S. Pat. No. 8,016,422 to Silverstein et al., entitled "Etendue maintaining polarization switching system and related methods," describe projection system configurations that fully utilize the light source for both polarization states. However, polarization techniques are disadvantaged by the additional cost and sensitivity of polarization maintaining screens, which typically utilize a structured metallic coating. These coatings are high gain, which improves on axis viewing, but are poor for off axis viewing. Furthermore, the specular reflections with this method can be troubling for some viewers. This effect is further exacerbated when using coherent light, as it leads to higher levels of viewer perceived speckle. Projectors using polarized light are typically more costly due to the difficulty of maintaining high polarization control through high angle optics as well as being more sensitive to dirt and defects. Therefore any gains in efficiency can be somewhat offset by other problems.

A continuing problem with illumination efficiency relates to etendue or, similarly, to the Lagrange invariant. As is well known in the optical arts, etendue relates to the amount of light that can be handled by an optical system. Potentially, the larger the etendue, the brighter the image. Numerically, etendue is proportional to the product of two factors, namely the image area and the numerical aperture. In terms of the simplified optical system represented in FIG. 1 having light source 12, optics 18, and a spatial light modulator 20, the etendue of the light source is a product of the light source area A1 and its output angle θ1. Likewise, the etendue of the spatial light modulator 20 equal to the product of the modulator area A2 and its acceptance angle θ2. For increased brightness, it is desirable to provide as much light as possible from the area of light source 12. As a general principle, the optical design is advantaged when the etendue at the light source 12 is most closely matched to the etendue at the spatial light modulator 20.

Increasing the numerical aperture, for example, increases the etendue so that the optical system captures more light. Similarly, increasing the light source size, so that light originates over a larger area, increases etendue. In order to utilize an increased etendue on the illumination side, the etendue of the spatial light modulator 20 must be greater than or equal to that of the light source 12. Typically, however, the larger the spatial light modulator 20, the more costly it will be. This is especially true when using devices such as LCOS and DLP components, where the silicon substrate and defect potential increase with size. As a general rule, increased etendue results in a more complex and costly optical design.

Efficiency improves when the etendue of the light source is well-matched to the etendue of the spatial light modulator. Poorly matched etendue means that the optical system is either light-starved, unable to provide sufficient light to the spatial light modulators, or inefficient, effectively discarding a substantial portion of the light that is generated for modulation.

Solid-state lasers promise improvements in etendue, longevity, and overall spectral and brightness stability. Recently, devices such as VCSEL (Vertical Cavity Surface-Emitting Laser) laser arrays have been commercialized and show some promise, when combined in various ways, as potential light sources for digital cinema projection. However, brightness itself is not yet high enough; the combined light from as many as 9 individual arrays is needed in order to provide the necessary brightness for each color.

Laser arrays of particular interest for projection applications are various types of VCSEL arrays, including VECSEL (Vertical Extended Cavity Surface-Emitting Laser) and NECSEL (Novalux Extended Cavity Surface-Emitting Laser) devices from Novalux, Sunnyvale, Calif.

However, even with improvements in laser technology and in filter preparation and cost, there is considerable room for improvement in methods of stereoscopic imaging projection. Conventional solutions that use spectral separation of left- and right-eye images are typically light-starved, since at most only half of the light that is generated is available for each eye. Thus, there is a need for a stereoscopic imaging solution that uses spectral separation with increased light efficiency.

SUMMARY OF THE INVENTION

The present invention represents a color stereoscopic digital projection system having a plurality of color channels for projecting a color stereoscopic image including a left-eye image and a right-eye image, comprising:
  a left-eye image forming system including:
  a plurality of left-eye light sources, each providing a light beam having a different spectral band corresponding to a different color channel, the spectral bands falling within either a red color spectrum, a green color spectrum or a blue color spectrum;
  a first spatial light modulator having an array of pixels that can be modulated according to image data to provide imaging light;
  illumination optics arranged to receive the light beams for the left-eye light sources and provide corresponding substantially uniform bands of light;
  beam scanning optics arranged to cyclically scroll the bands of light for the left-eye light sources across the first spatial light modulator such that the bands of light are substantially non-overlapping; and
  a controller system that synchronously modulates the pixels of the first spatial light modulator according to image data for the left-eye image, wherein the pixels illuminated by the each band of light are modulated according to the image data for the corresponding color channel of the left-eye image;
  a right-eye image forming system including:
  a plurality of right-eye light sources, each providing a light beam having a different spectral band corresponding to a different color channel, the spectral bands falling within either a red color spectrum, a green color spectrum or a blue color spectrum, wherein each of the right-eye light sources corresponds to one of the left-eye light sources, and wherein the corresponding right-eye and left-eye light sources have spectrally-adjacent, substantially non-overlapping spectral bands, both spectral bands falling within the same red color spectrum, the green color spectrum or the blue color spectrum;
  a second spatial light modulator having an array of pixels that can be modulated according to image data to provide imaging light;
  illumination optics arranged to receive the light beams for the right-eye light sources and provide corresponding substantially uniform bands of light;
  beam scanning optics arranged to cyclically scroll the bands of light for the right-eye light sources across the second spatial light modulator such that the bands of light are substantially non-overlapping; and
  a controller system that synchronously modulates the pixels of the second spatial light modulator according to image data for the right-eye image, wherein the pixels illuminated by the each band of light are modulated according to the image data for the corresponding color channel of the right-eye image;
  beam combining optics that combine the imaging light from the left-eye and right-eye image forming systems onto a common optical axis, wherein the beam combining optics includes one or more dichroic filters arranged to selectively transmit the spectral bands from one of the image forming systems and selectively reflect the spectral bands from the other image forming system;
  projection optics for delivering the combined imaging light to a display surface; and
  filter glasses for a viewer that selectively transmit light in the spectral bands of the left-eye light sources to the viewer's left eye and selectively transmit light in the spectral bands of the right-eye light sources to the viewer's right eye.

This invention has the advantage that the light sources can be continuously on, utilizing a high percentage of the generated light for forming stereoscopic images.

It has the additional advantage that the projected stereoscopic images can be viewed on conventional projection screens that are not polarization preserving.

It has the further advantage that stereoscopic images can be formed using only two spatial light modulators.

BRIEF DESCRIPTION OF THE DRAWINGS

FIG. 6A is a schematic diagram that shows the use of a rotating prism for scanning a single band of color;

Figure 1:
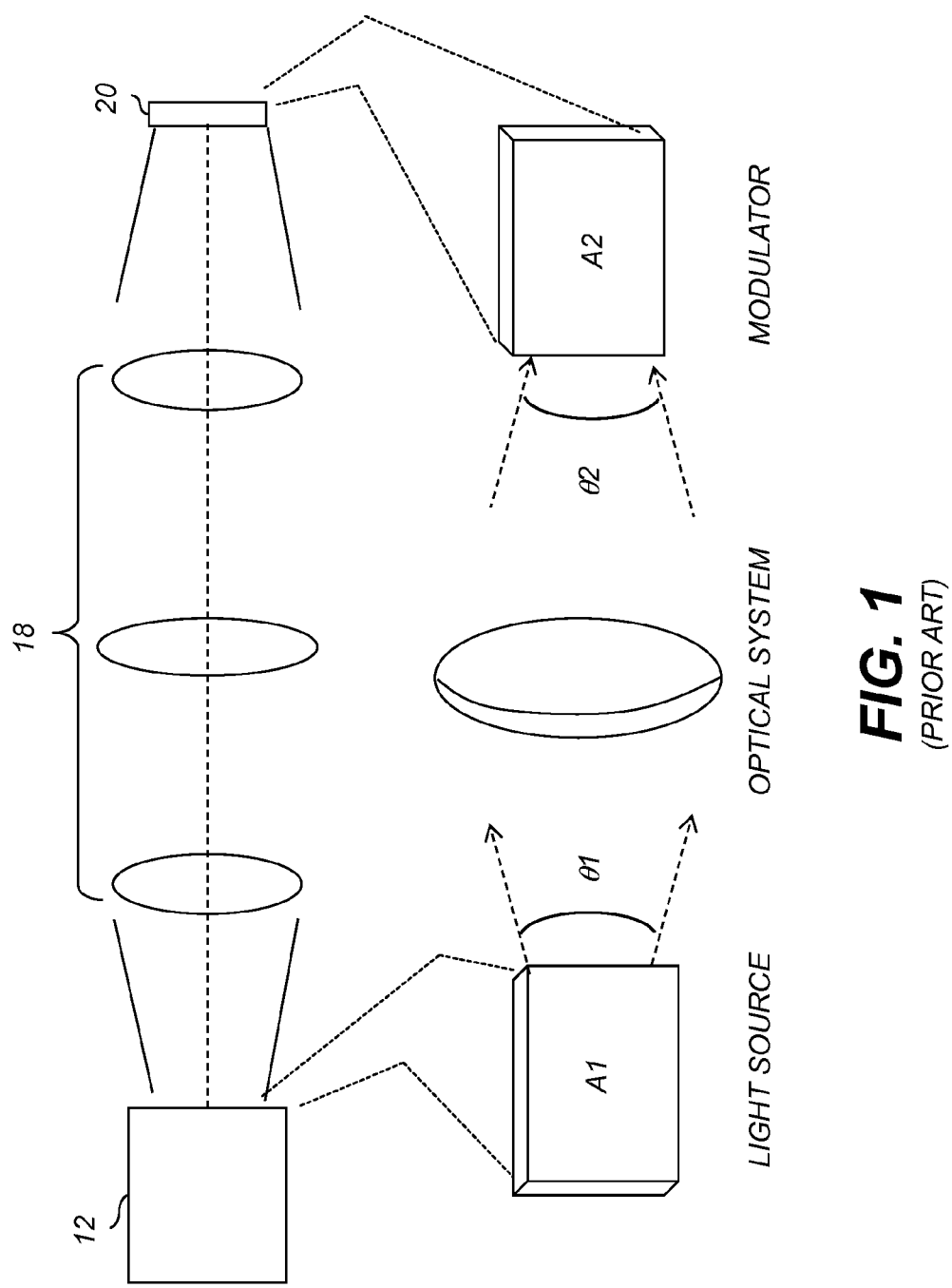
FIG. 1 is a representative diagram showing factors in etendue calculation for an projection system.

It is to be understood that the attached drawings are for purposes of illustrating the concepts of the invention and may not be to scale.

DETAILED DESCRIPTION OF THE INVENTION

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

The present description is directed in particular to elements forming part of, or cooperating more directly with, apparatus in accordance with the invention. It is to be understood that elements not specifically shown or described may take various forms well known to those skilled in the art.

Figures shown and described herein are provided to illustrate principles of operation according to the present invention and are not drawn with intent to show actual size or scale. Because of the relative dimensions of the component parts for the laser array of the present invention, some exaggeration is necessary in order to emphasize basic structure, shape, and principles of operation. In addition, various components such as those used to position and mount optical components, for example, are not shown in order to better show and describe components that relate more closely to embodiments of the present invention.

Where they are used, the terms "first", "second", and so on, do not necessarily denote any ordinal or priority relation, but may be simply used to more clearly distinguish one element from another.

The terms "color" and "wavelength band" and "spectral band" are generally synonymous as used in the context of the present disclosure. For example, a laser or other solid-state light source is referred to by its general color spectrum, such as red, rather than by its peak output wavelength (such as 635 nm) or its wavelength band (such as 630-640 nm). In the context of the present disclosure, different wavelength bands are considered to be essentially non-overlapping.

Embodiments of the present invention address the need for improved brightness in a stereoscopic viewing system using independent spectrally-adjacent light sources. In the context of the present invention, the term "spectrally-adjacent" relates to nearby spectral substantially non-overlapping spectral bands within the same general portion of the color spectrum that are used for the component colors that form a color image, typically Red, Green, Blue, and possibly including a fourth color and other additional colors. The corresponding spectrally-adjacent colors for each component color lie in the same portion of the color spectrum (e.g., red, green or blue), but have different spectral bands (i.e., wavelength ranges) for left- and right-eye images that are substantially non-overlapping with respect to wavelength.

Viewer filter glasses incorporate filters that are configured to transmit the appropriate spectral bands to each eye and to block the spectral bands used to form the image for the other eye. Blocking can be by reflection or by absorption, for example.

By way of example, and not by way of limitation, Table 1 lists typical component color spectra and example spectrally-adjacent spectral bands according to an embodiment of the present invention. In practice, for stereoscopic display purposes, having spectrally non-overlapping colors means that there is no perceptible crosstalk (i.e., color channel information from the left-eye image is essentially imperceptible to the right eye of the observer and vice versa). This is only true if the associated filter for each eye also properly rejects the light from the opposing eye over operational conditions such as angles of viewing.

TABLE 1

Exemplary Spectrally-Adjacent Spectral Bands

| Component Color Spectrum | Right-Eye Image Spectral Band | Left-Eye Image Spectral Band |
|---|---|---|
| Red (625-675 nm) | 630-640 nm | 655-665 nm |
| Green (505-555 nm) | 510-520 nm | 535-550 nm |
| Blue (440-490 nm) | 444-454 nm | 468-482 nm |

In this example, each spectrally-adjacent spectral band has a bandwidth of approximately 10 nm, while the separation between the spectrally-adjacent bands for a particular component color spectrum is approximately 15 nm. The use of lasers enables a significant advantage in reducing the bandwidth of the adjacent spectrum, thereby allowing more separation between the adjacent bands. This is desirable in that the filters provided for each eye are inevitably sensitive to angle whereby the filter edges shift due to non-normal incidence. This is a commonly known problem in all optical filter designs. Therefore, using a reduced bandwidth light source helps to solve this problem enabling this common shift to occur without substantially impacting crosstalk. Many lasers have bandwidths on the order of 1 nm. While this may seem ideal, there is a desire for additional broadness in order to help reduce coherence artifacts such as laser speckle. A more desirable bandwidth would fall between 5 and 10 nm as a compromise to adding additional spectral separation and to reducing speckle sensitivities. A spectral separation of between 15 and 20 nm provides a practical solution to filter shift issues.

Figure 2:
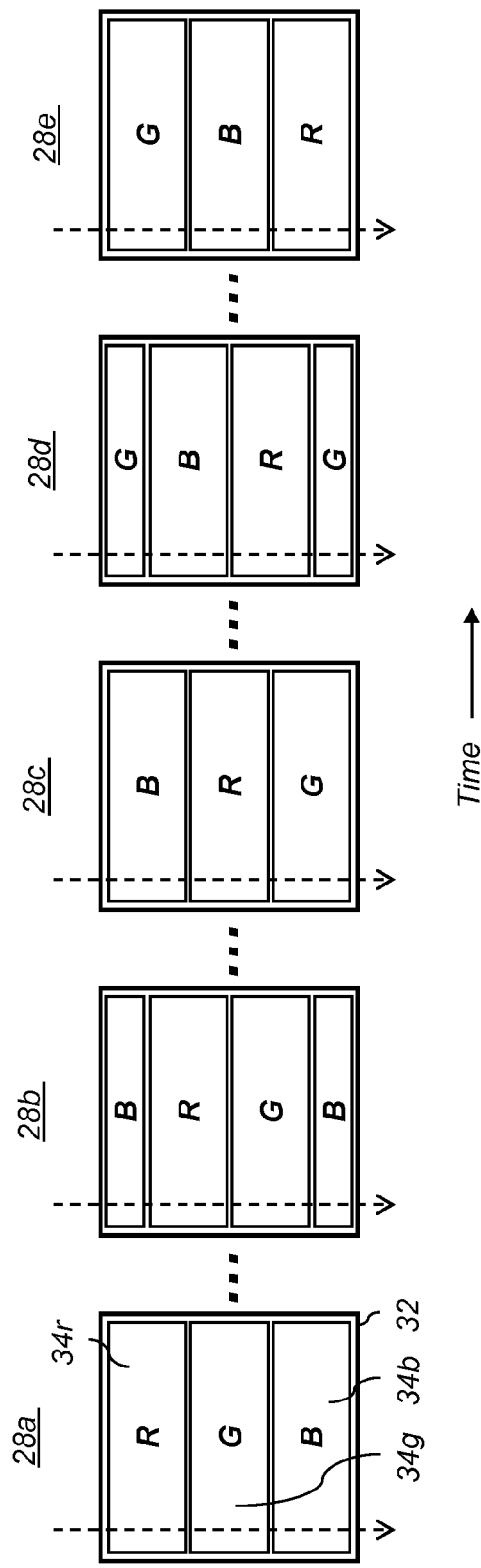
FIG. 2 is a schematic diagram showing a prior art color scrolling sequence.

The schematic diagram of FIG. 2 shows how the color scrolling sequence is used to provide a color image from component red (R), green (G), and blue (B) light in conventional practice, for a projection apparatus that is not stereoscopic. A series of image frames 28a, 28b, 28c, 28d, and 28e are shown as they are arranged at different times. Each frame has three bands of light 34r, 34g, and 34b having red, green and blue color components, respectively, that are scanned across image region 32, moving in the vertical direction in the example shown. As a band is scrolled off the bottom of the image frame, it is scrolled into the top of the image frame so that ⅓ of the image frame is covered by each of the color components at any given time.

A vertical scrolling motion is generally preferred because horizontal scrolling can be impacted by side to side movement of the viewer whereby the color bands may become perceptible. This is often referred to as a rainbow effect. The bands of light in this sequence can be from illumination components, scanned onto the spatial light modulator or may be imaged light from the spatial light modulator. The scanning action is cyclic, recurring at an imperceptible rate for the viewer, at a rate of many times per second (e.g., 144 Hz). As can be seen from this sequence, each image frame 28a, 28b, 28c, 28d, and 28e has each of the three component colors scanned over a different image region. In the image that is formed using this sequence, each frame has red, green, and blue image content, in the respective bands of light 34r, 34g, and 34b.

It can be readily appreciated that the color scrolling scheme of FIG. 2, while usable for non-stereoscopic color imaging, presents difficulties for stereoscopic color imaging systems. Providing stereoscopic color requires the scrolling of six different spectral bands, two for each of the component colors. Each source has its own etendue associated with it. Illuminating a single chip with six different sources, each also requiring a gap between them to prevent crosstalk and allowing for chip transition time from each of the color data associated with the particular color would quickly utilize the available etendue or require optically fast lenses. While this is feasible, it is undesirable, since projector brightness is severely constrained and cost of the optics quickly rises with such an arrangement.

To help improve image quality and deliver higher brightness, cinematic-quality projection systems for non-stereoscopic imaging often employ separate color channels for each color, typically providing each of a red, green, and blue color channel. A spatial light modulator is provided in each color channel. This arrangement enables the optical design to optimize the design and features of components, such as filters and coatings, for example, to improve their performance for light of the respective wavelengths.

Figure 3:
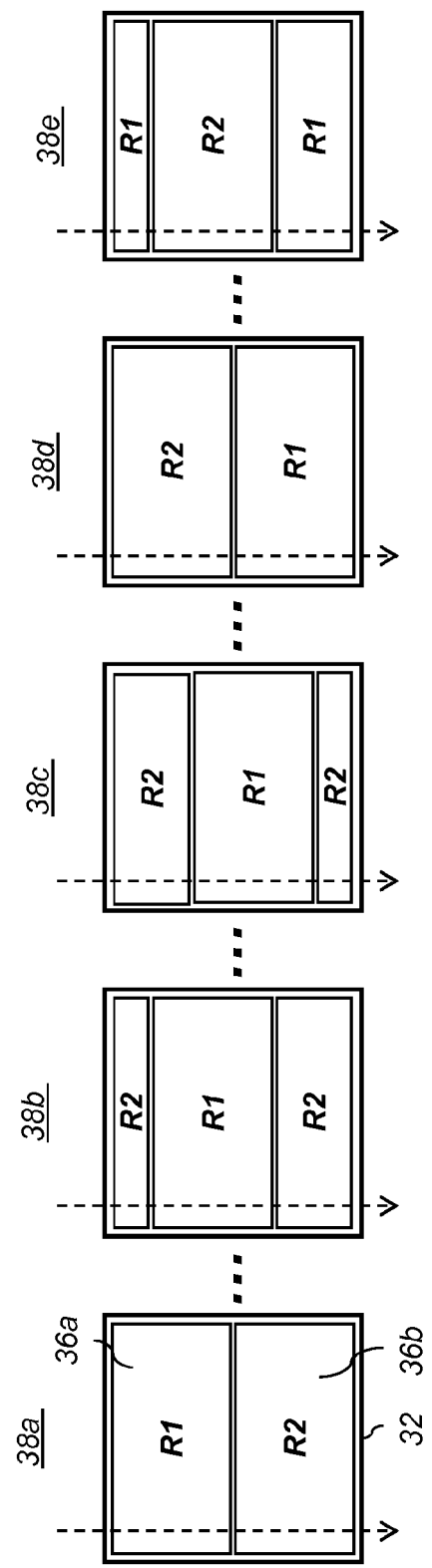
FIG. 3 is a schematic diagram showing a single-channel color scrolling sequence using spectrally-adjacent bands of color according to an embodiment of the present invention.

FIG. 3 shows a color scanning arrangement for a stereoscopic projection system according to a first embodiment of the present invention. In this configuration, spectrally-adjacent spectral bands within a single component color spectrum are scrolled across the image region 32, rather than bands corresponding to the different color components as in the arrangement of FIG. 2. In this example, spectrally-adjacent red spectral bands R1 and R2 are scrolled, as bands of light 36a and 36b, across image frames 38a, 38b, 38c, 38d, and 38e according to an embodiment of the present invention. The R1 spectral band is used to provide the left-eye image and the R2 spectral band is used to provide the right-eye image for the projected stereoscopic image. Similar spectral scrolling mechanisms are provided for each color channel of the stereoscopic image, as will subsequently be described in more detail. The scrolled bands of spectrally-adjacent light are substantially spectrally non-overlapping, so that less than 5% of the light from one of the scrolled bands overlaps with the other spectral band. Further by maintaining the light of the same color within its own color channel, the optical coatings for the optical components associated with a particular color component can continue to be optimized for the respective color component.

Figure 4A:
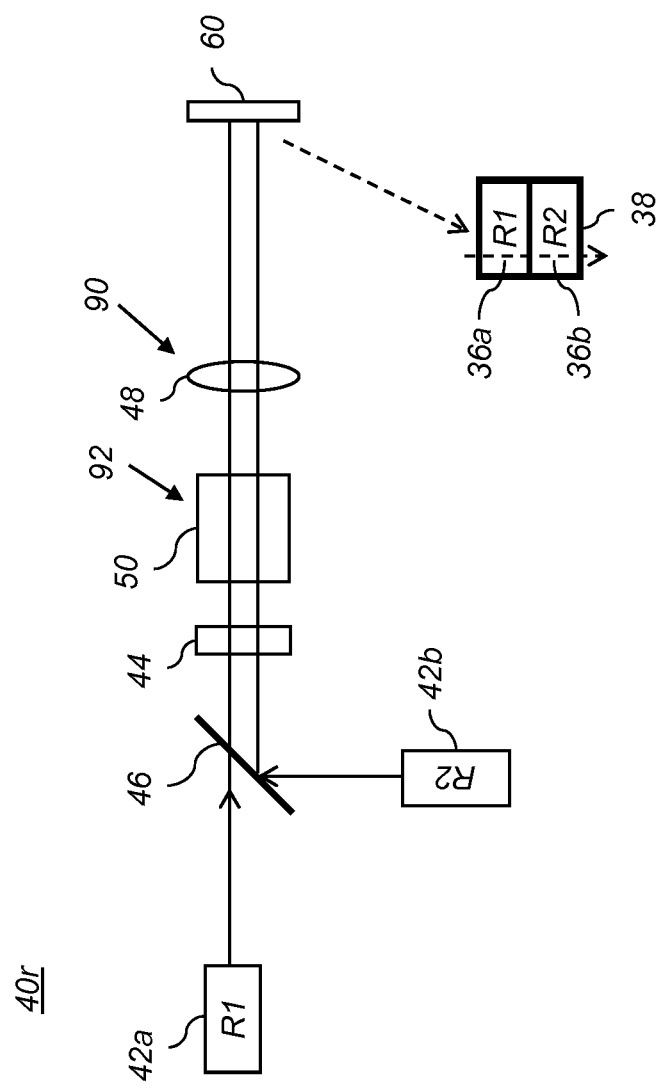
FIG. 4A is a schematic diagram that shows parts of a single color channel in a stereoscopic digital projection system that uses a single beam scanner to provide two spectrally-adjacent bands of color.
Figure 4B:
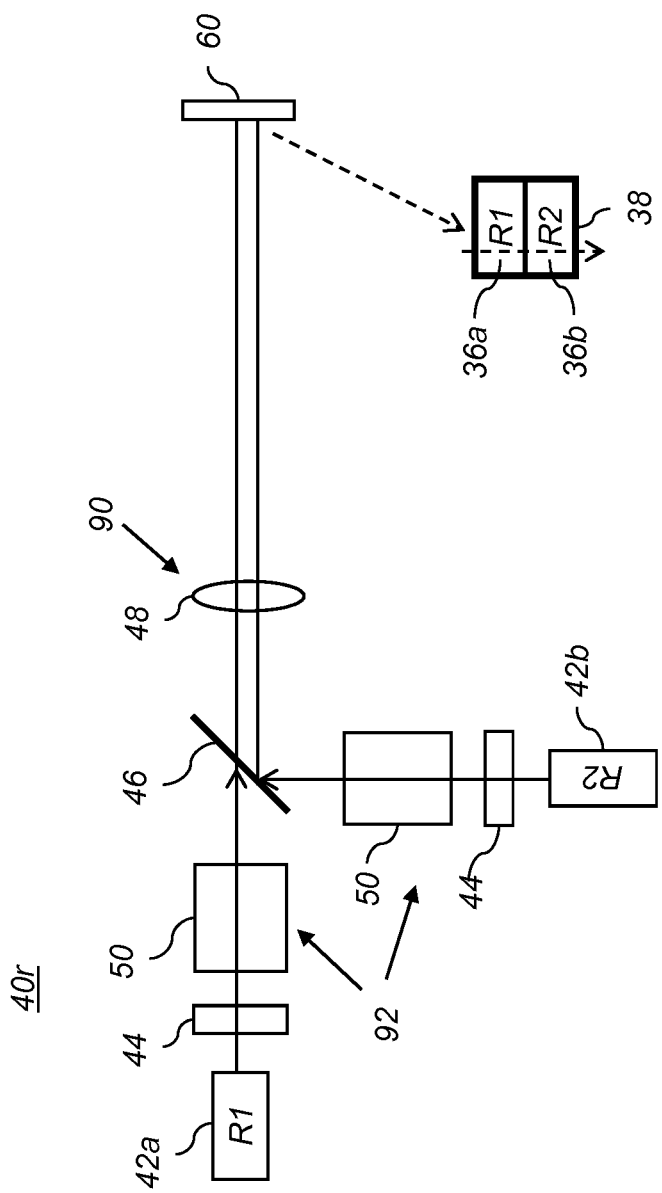
FIG. 4B is a schematic diagram that shows parts of a single color channel in a stereoscopic digital projection system that uses a separate beam scanner to provide each spectrally-adjacent band of color.

The schematic diagrams of FIGS. 4A and 4B show parts of a red color channel 40r for color scrolling spectrally-adjacent colors in a single color channel, compatible with an embodiment of the present invention. A light source 42a emits a beam of light in the R1 spectral band, and another light source 42b emits a beam of light in the R2 spectral band. Illumination optics 90 provide substantially uniform bands of light onto spatial light modulator 60 for modulation in each of the two spectrally-adjacent spectral bands. Beam scanning optics 92 including a beam scanner 50 provide the cyclical scrolling of the bands of light. It will be recognized that the illumination optics 90 can include multiple lens 48, some of which may be positioned between the uniformizing optics 44 and the beam scanning optics 92, with others being positioned between the beam scanning optics 92 and the spatial light modulator 60. In a preferred embodiment, the illumination optics 90 image an output face of the uniformizing optics 44 onto the spatial light modulator 60, thereby providing the uniform bands of light. An advantage of this approach is that the light sources 42a and 42b can be continuously on during projection, providing increased light output over other stereoscopic projection methods.

In the configuration of FIG. 4A, a beam combiner 46 combines the light beams from the light sources 42a and 42b onto parallel optical axes and directs the spatially-adjacent light beams into uniformizing optics 44, such as one or more lenslet arrays or uniformizing bars, to provide substantially uniform spatially-adjacent light beams. A beam scanner 50 then cyclically scrolls the combined uniformized light and directs the scrolled combined light beam onto the spatial light modulator 60 through the illumination optics 90, which provide for beam imaging, shaping and conditioning. In FIG. 4A, the illumination optics 90 are represented as lens 48; however in various embodiments the illumination optics 90 can include different (or multiple) optical components. The beam separation required to prevent crosstalk between the bands of light may be provided by use of spatial or angular separation of the incoming beams of light to beam scanner 50. In the event that differing angles are utilized, it is generally desired that another element, such as a dichroic beam combiner, be provided downstream of the beam scanner 50 to return the scanned beams of light onto parallel optical axes.

The spatial light modulator 60 forms an image frame 38 having corresponding bands of light 36a and 36b. The bands of light 36a and 36b are cyclically scrolled as described previously. The spatial light modulator 60 has an array of pixels that can be individually modulated according to image data to provide imaging light. The spatial light modulator pixels illuminated by the R1 spectral band are modulated according to image data for the left-eye image and the spatial light modulator pixels illuminated by the R2 spectral band are modulated according to image data for the right-eye image.

In the alternate configuration of FIG. 4B, separate uniformizing optics 44 and beam scanners 50 are utilized in the light beams from each of the light sources 42a and 42b to provide two scanned light beams. The beam combiner 46 then combines the scanned light beams to form a combined scanned light beam, which is directed onto the spatial light modulator 60 using illumination optics 90. In this case the beam scanning optics 92 includes both beam scanners 50.

Figure 5:
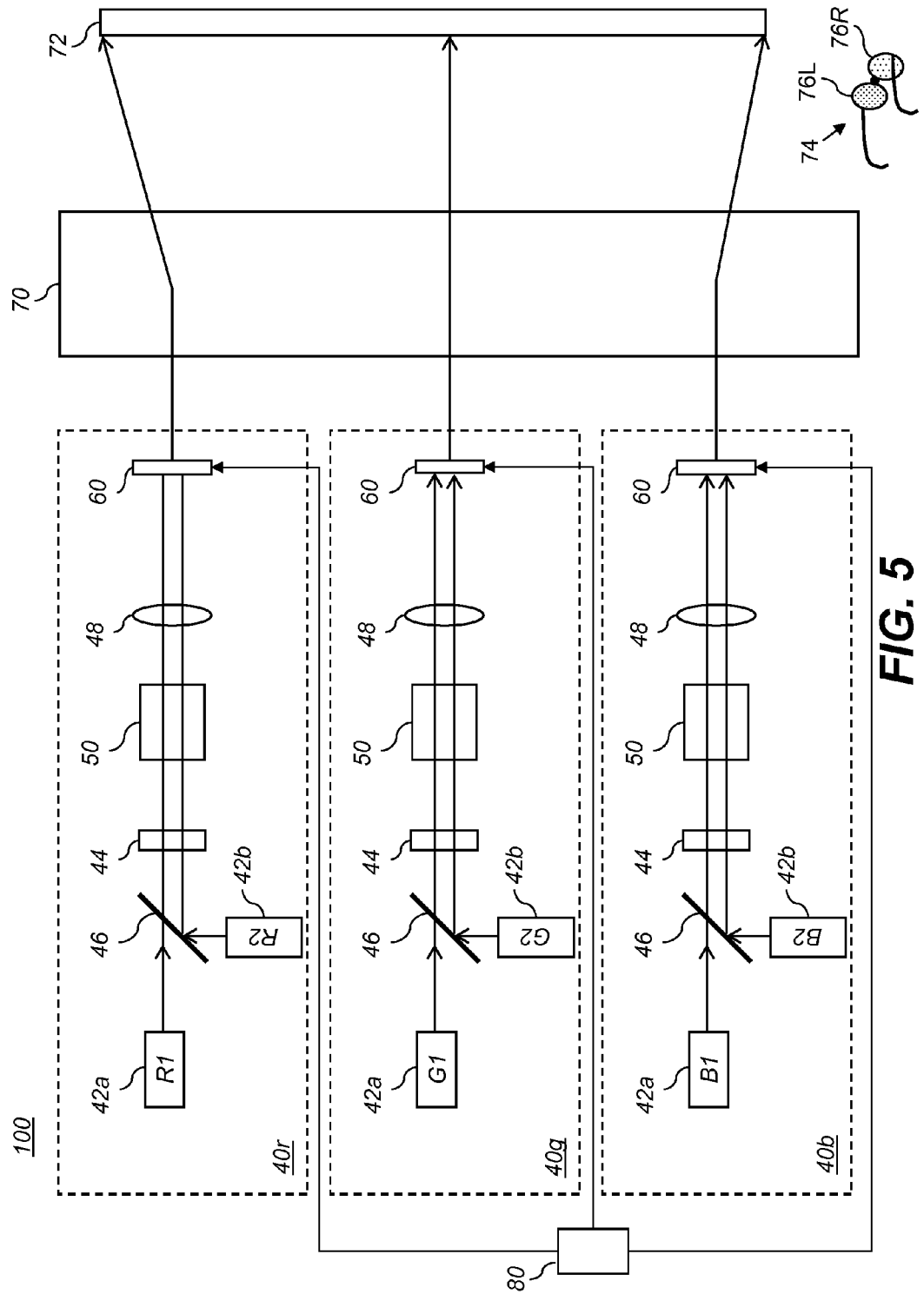
FIG. 5 is a schematic diagram showing a stereoscopic digital projection system having three color channels, each using the configuration of FIG. 4A.

The schematic diagram of FIG. 5 shows a stereoscopic digital projection system 100 that has three color channels (i.e., red color channel 40r, a green color channel 40g, and a blue color channel 40b). The red color channel 40r includes spectrally-adjacent red spectral bands R1 and R2; the green color channel 40g includes spectrally-adjacent green spectral bands G1 and G2; and the blue color channel 40b includes spectrally-adjacent blue spectral bands B1 and B2. Projection optics 70 deliver the imaging light from the three spatial light modulators 60 to a display surface 72. The viewer observes display surface 72 through viewing glasses 74 having a filter 76L for the left eye and a filter 76R for the right eye. The filter 76L selectively transmits the imaging light for the left-eye image (i.e., light in the R1, G1 and B1 spectral bands), while absorbing (or reflecting) the imaging light for the right-eye image (i.e., light in the R2, G2 and B2 spectral bands). Similarly, filter 76R selectively transmits the imaging light for the right-eye image (i.e., light in the R2, G2 and B2 spectral bands), while absorbing (or reflecting) the imaging light for the left-eye image (i.e., light in the R1, G1 and B1 spectral bands).

The filters 76L and 76R can be made using any fabrication technique known in the art. In some embodiments, one or both of the filters 76L and 76R are dichroic filters that includes an optical surface having a multi-layer thin-film coating. The multi-layer thin-film coating is designed to provide a spectral comb filter having a series of notches that transmits the spectral bands corresponding to the imaging light for one eye while absorbing or reflecting the spectral bands corresponding to the imaging light for the other eye. Techniques for designing and fabricating multi-layer thin-film coatings having specified spectral transmittance characteristics are well known in the art.

In other embodiments, one or both of the filters 76L and 76R are multi-layer dichroic filters that are fabricated using a co-extruded stretched polymer film structure. One method for fabricating such structures is described in U.S. Pat. No. 6,967,778 to Wheatley et al., entitled "Optical film with sharpened bandedge," which is incorporated herein by reference. According to this method, a coextrusion device receives streams of diverse thermoplastic polymeric materials from a source such as a heat plastifying extruder. The extruder extrudes a multi-layer structure of the polymeric materials. A mechanical manipulating section is used to stretch the multi-layer structure to achieve the desired optical thicknesses.

A controller system 80 synchronously modulates the pixels of each spatial light modulator 60 according to image data for the stereoscopic image. The controller system 80 is coupled to the beam scanners 50 so that it knows which spatial light modulator pixels are illuminated by the different spectrally-adjacent bands at any given time. The spatial light modulator pixels that are illuminated by the first spectral band are modulated according to image data for the left-eye image and the spatial light modulator pixels that are illuminated by the second spectral band are modulated according to image data for the right-eye image. Since the first and second spectral bands are continuously scrolling, the subsets of the spatial modulator pixels that are modulated with the image data for left-eye and right-eye images are continuously changing as well.

Projection optics 70 may combine the light beams from the three color channels (e.g., using beam combining optics) and project the combined beam through a single projection lens. Alternately, the projection optics 70 may use three separate projection lenses to project each of the color channels separately onto the display surface 72 in an aligned fashion.

As noted earlier with reference to FIGS. 4A and 4B, the beam scanning optics 92 including one or more beam scanners 50 can be configured to provide band of light scrolling using a number of different arrangements, and can be positioned at any suitable point along the illumination path. Consistent with one embodiment of the present invention, FIG. 6A shows a schematic diagram of a beam scanner 50 which includes a single scanning element, namely a rotating prism 52. In this configuration, a rotating prism 52 can be provided for each of the spectrally-adjacent spectral bands in each of the component color bands. Rotation of the prism 52 redirects the light beam, shown here for the R1 spectral band, by refraction, so that the light beam position is cyclically scrolled across spatial light modulator 60. The FIG. 6A arrangement is used, for example, in the color channel embodiment shown in FIG. 4B.

In the top diagram of FIG. 6A, the prism 52 is positioned so that the incident beam is normally incident on a face of the prism. In this case the light beam passes through the prism 52 in an undeflected fashion. In the middle diagram, the prism 52 has been rotated around axis O so that the light beam is incident at an oblique angle onto the face of the prism. In this case, the beam is refracted downward so that it intersects the spatial light modulator at a lower position. In the lower diagram, the prism 52 has been rotated so that the incident beam now strikes a different facet of the prism 42. In this case, the beam is refracted upward so that it intersects the spatial light modulator 60 at a higher position. It should be noted that the incident beam will generally have a substantial spatial (and angular) extent so that at some prism orientations some of the light rays in the incident beam may strike different faces of the prism. In this way, some of the light rays will be deflected upwards, while others may be deflected downwards. This provides for the band of light to be split between the upper and lower portions of the image frame as shown in image frame 38e of FIG. 3.

Figure 6B:
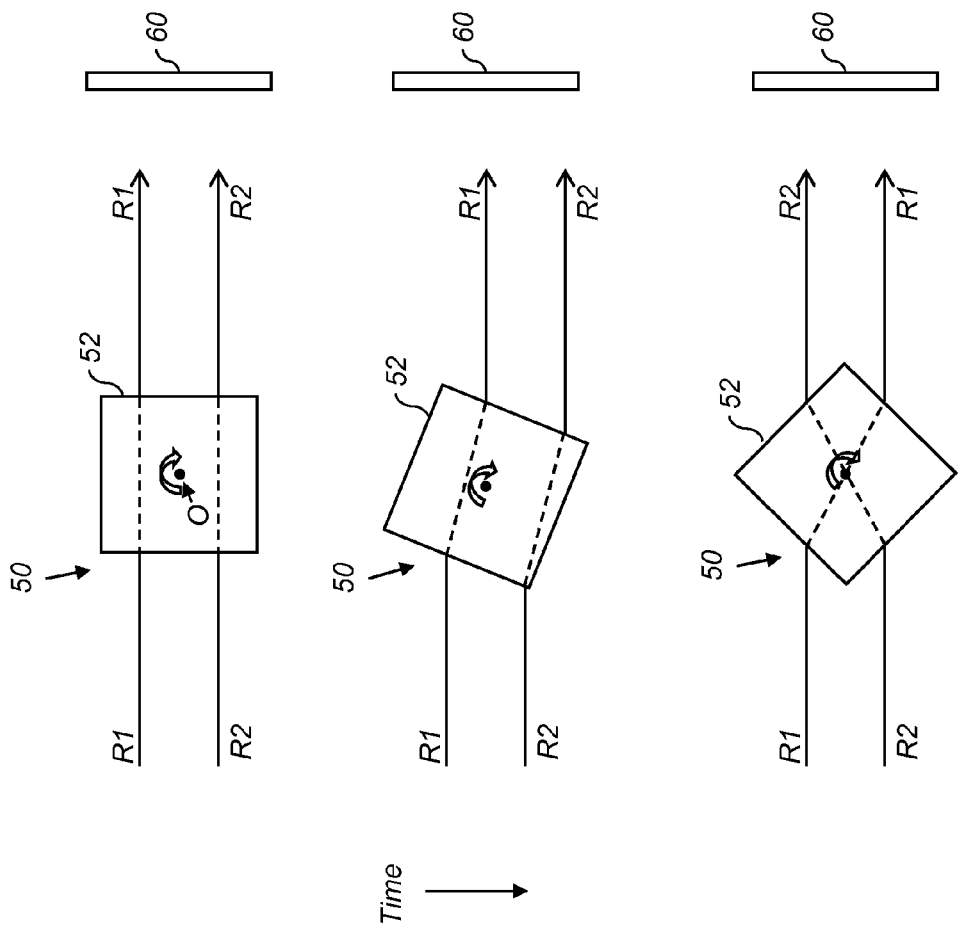
FIG. 6B is a schematic diagram that shows the use of a rotating prism for scanning two bands of color.

FIG. 6B is a schematic diagram that shows an alternate embodiment for beam scanner 50, in which a rotating prism 52 simultaneously scans the bands of light for both of the spectrally-adjacent spectral bands in a single color channel (in this example spectral bands R1 and R2). This configuration is appropriate for use in the example embodiment of FIG. 4A. In this case, light beams for both of the R1 and R2 spectral bands are incident on the prism 52. As the prism 52 rotates, both of the light beams are simultaneously redirected by refraction.

Figure 6C:
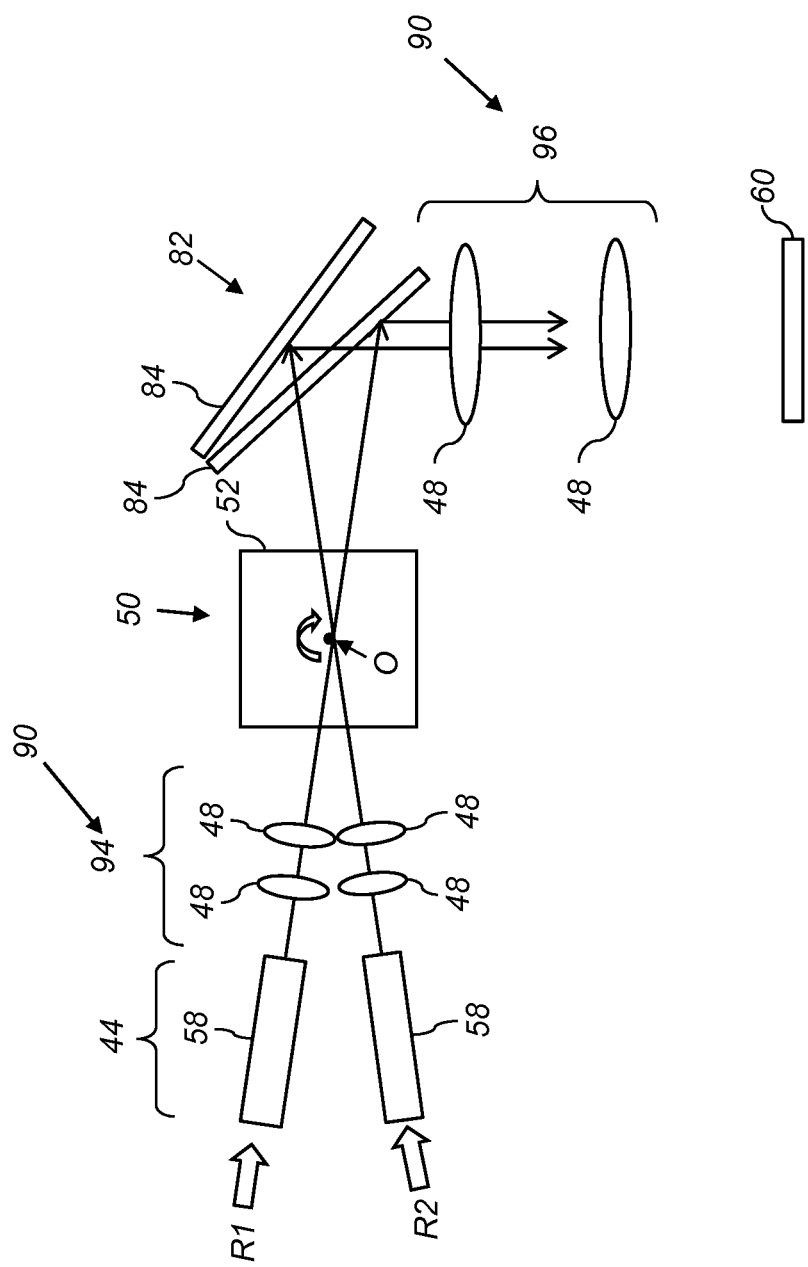
FIG. 6C is a schematic diagram showing another configuration for using a rotating prism for scanning two bands of color.

FIG. 6C is a schematic diagram that shows another alternate embodiment for beam scanner 50, in which a rotating prism 52 simultaneously scans the bands of light for both of the spectrally-adjacent spectral bands in a single color channel (in this example spectral bands R1 and R2). In this case, the beams of light incident on the rotating prism come from two different angular directions. Uniformizing optics 44 are used to uniformize each of the spectrally-adjacent light beams. In this example, the uniformizing optics 44 include integrating bars 58. The illumination optics 90 are split into a first stage 94 and a second stage 96, each including a plurality of lenses 48. In this configuration, the lenses 48 in the first stage 94 are arranged to provide telecentricity between the output face of the integrating bars 58 and the prism 52. Similarly, the lenses 48 in the second stage 96 are arranged to provide telecentricity between the prism 52 and the spatial light modulator 60. A dichroic combiner 82, including one or more dichroic surfaces 84, is used to direct the scanned light beams onto parallel optical axes for illuminating the spatial light modulator 60.

The multi-angle geometry of FIG. 6C is similar to that taught by Conner in U.S. Pat. No. 7,147,332, entitled "Projection system with scrolling color illumination." Connor teaches a projection system having a scrolling prism assembly to simultaneously illuminate different portions of a spatial light modulator with different color bands. White light is divided into different color bands that propagate through the scrolling prism in different directions. The scrolled color bands are reflectively combined so that the different color bands pass out of the scrolling prism assembly parallel. However, Conner does not teach scrolling spectrally-adjacent spectral bands from independent light sources to provide for stereoscopic projection.

A rotating prism or other refractive element is one type of device that can be used for the beam scanner 50. The term "prism" or "prism element" is used herein as it is understood in optics, to refer to a transparent optical element that is generally in the form of an n-sided polyhedron with flat surfaces upon which light is incident and that is formed from a transparent, solid material that refracts light. It is understood that, in terms of shape and surface outline, the optical understanding of what constitutes a prism is less restrictive than the formal geometric definition of a prism and encompasses that more formal definition. While FIGS. 6A-6C depict a rectangular prism with a square cross-section, in many instances it is desired to have more than four facets in order to provide improved scanning results. For example, a hexagonal prism, or an octagonal prism can be used in various embodiments.

Alternate types of components that can be utilized for beam scanner 50 include rotating mirrors or other reflective components, devices that translate across the beam path and provide variable light refraction, reciprocating elements, such as a galvanometer-driven mirror, or pivoting prisms, mirrors, or lenses.

When multiple beam scanners 50 are utilized, it is critical to synchronize the rotation of all of the beam scanners 50, and subsequently the image data associated with the different spectral bands. One method, not depicted, is to configure the optical arrangement such that a single motor is used to control the moving optical elements for at least two of the beam scanners 50. For example a single axle can be used to drive multiple prisms 52 using a single motor. In some embodiments, a single rotating prism 52 can be used to scan multiple spectral bands by directing light beams through the prism 52 from multiple directions, or by directing light beam through different portions of the prism 52 (as shown in FIG. 6B).

As shown in the examples of FIGS. 4A, 4B, and 5, beam paths for the spectrally-adjacent spectral bands can be aligned with each other to illuminate spatial light modulator 60 using the beam combiner 46. The beam combiner 46 can be a dichroic beam combiner, or can use any other type of beam combining optics known in the art.

The uniformizing optics 44 condition the light beams from the light sources 42a and 42b to provide substantially uniform beams of light for scanning. In the context of the present disclosure, the term "substantially uniform" means that the intensity of the beam of light incident on the spatial light modulator 20 appears to be visually uniform to an observer. In practice, the intensity of the uniformized light beams should be constant to within about 30%, with most of the variation occurring being a lower light level toward the edges of the uniformized light beams. Any type of uniformizing optics 44 known in the art can be used, including integrating bars or lenslet arrays.

Figure 7B:
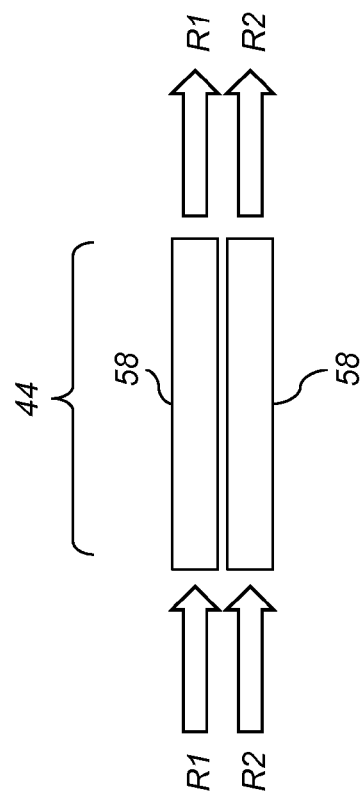
FIG. 7B is a schematic diagram that shows uniformizing optics including two integrating bars.
Figure 7A:
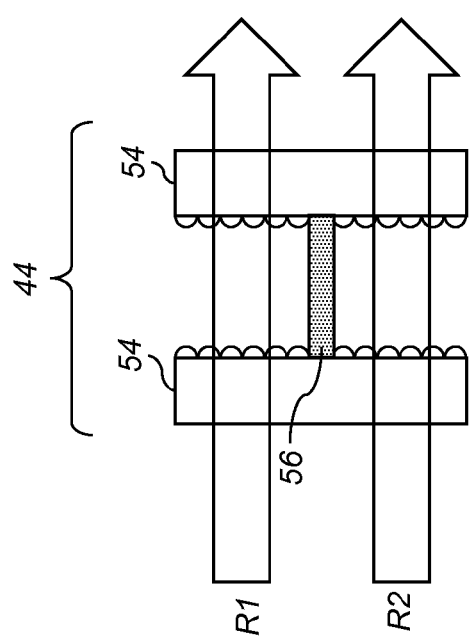
FIG. 7A is a schematic diagram that shows uniformizing optics including two lenslet arrays.

FIG. 7A shows an example of uniformizing optics 44 that can be used for the embodiment of FIG. 4A. The uniformizing optics 44 use a pair of lenslet arrays 54 to uniformized the light beams. One of the spatially-adjacent light beams (e.g., for the R1 spectral band) is passed through the top half of the lenslet arrays 54, while the other spatially-adjacent light beam (e.g., for the R2 spectral band) passes through the bottom half of the lenslet arrays 54. An opaque block 56 is provided between the light beams for the spectrally-adjacent spectral bands, to help prevent crosstalk. In this manner a single lenslet array structure may be utilized per color band thereby reducing costs.

FIG. 7B shows another example of uniformizing optics 44 that can be used for the embodiment of FIG. 4A. In this case, the uniformizing optics 44 use a pair of integrating bars 58 to uniformized the light beams. One of the spatially-adjacent light beams (e.g., for the R1 spectral band) is passed through the upper integrating bar 58, while the other spatially-adjacent light beam (e.g., for the R2 spectral band) passes through the lower integrating bar 58.

Figure 8:
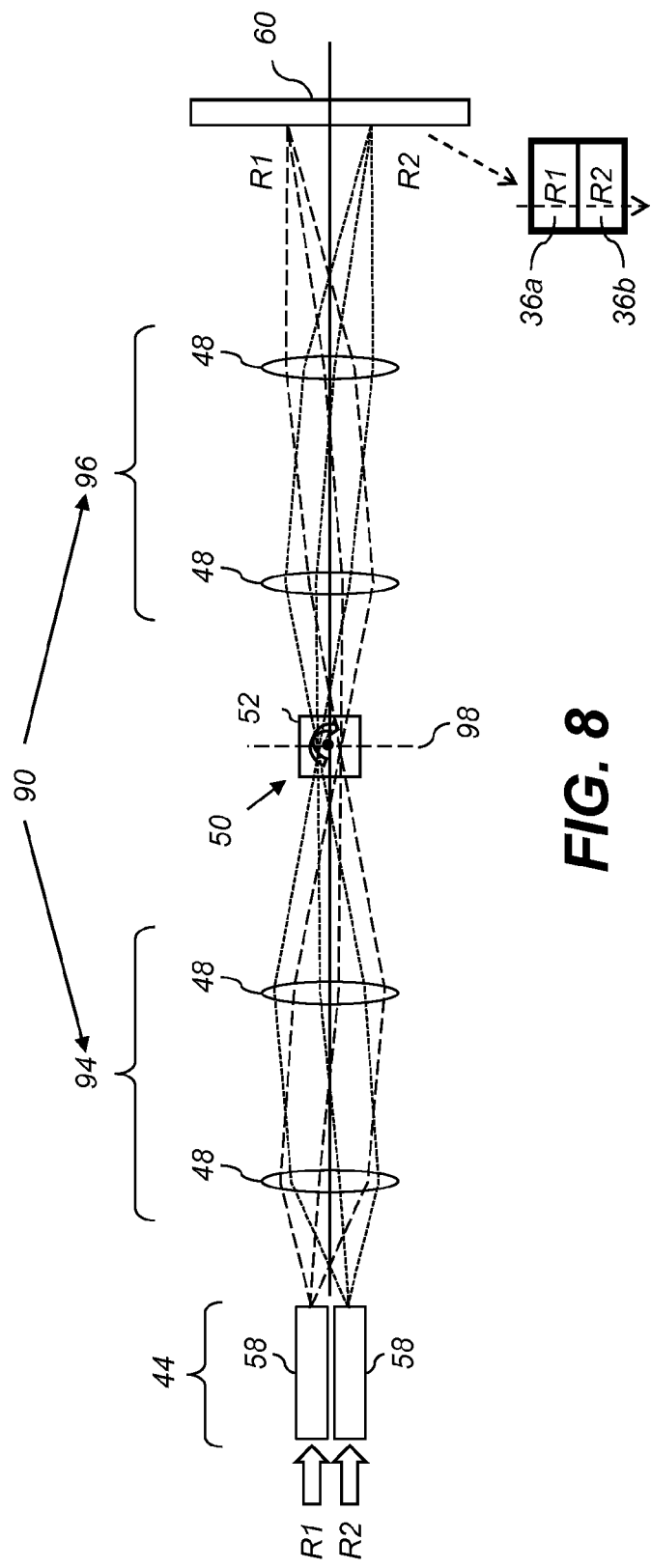
FIG. 8 is a schematic diagram showing a beam scanning configuration according to an embodiment of the present invention.

As mentioned earlier, in a preferred embodiment, the output face(s) of the uniformizing optics 44 are imaged onto the spatial light modulator 60 using the illumination optics 90, where the imaging light passes through the beam scanning optics 92. It will be obvious to one skilled in the art that many different configurations for the illumination optics 90 can be used to provide this feature. FIG. 8 shows one embodiment where the illumination optics 90 are divided into a first stage 94 and a second stage 96, each including two lenses 48. The lenses 48 in the first stage 94 form an image of the output faces of integrating bars 58 at an intermediate image plane 98 corresponding to the position of the prism 52, which is a component of the beam scanner 50. The second stage 96 forms an image of the intermediate image plane 98 onto the spatial light modulator 60, thereby providing substantially-uniform bands of light 36a and 36b. The bands of light are scanned across the spatial light modulator as the prism 52 is rotated. The lenses 48 can be used to adjust the magnification of the intermediate image according to the size of the prism 52, and to adjust the magnification of the scanned bands of light according to the size of the spatial light modulator 60.

The controller system 80 (FIG. 5) synchronously modulates the pixels of each spatial light modulator 60 according to image data for the stereoscopic image. Logic in the controller system 80 coordinates the image data for the left- and right-eye image content with the corresponding positions of each band of light 36a and 36b. The controller system 80 may be a computer or dedicated processor or microprocessor associated with the projector system, for example, or may be implemented in hardware.

Embodiments of the present invention are well suited to using solid-state light sources such as lasers, light-emitting diodes (LEDs), and other narrow-band light sources, such as those having a spectral bandwidth of 10 nm or less. Other types of light sources that could be used include quantum dot light sources. In still other embodiments, one or more white light sources could be used, along with corresponding filters for obtaining the desired spectral content for each color channel. Methods for splitting polychromatic or white light into light of individual color spectra are well known to those skilled in the image projection arts and can employ standard devices such as X-cubes and Phillips prisms, for example, with well-established techniques for light conditioning and delivery.

Figure 9:
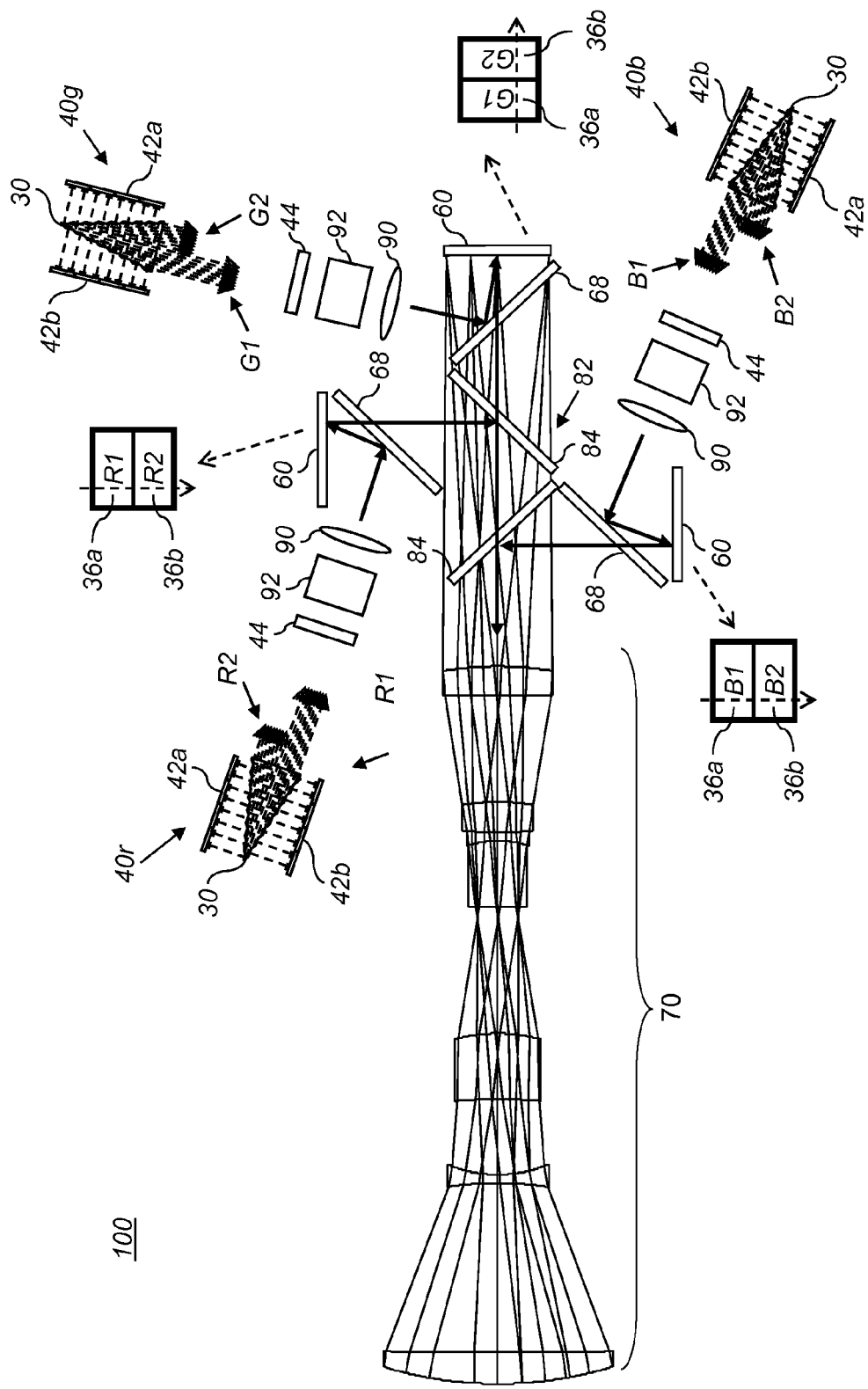
FIG. 9 is a schematic diagram of a stereoscopic color scrolling digital projection system having three color channels and using combining optics for arrays of solid-state light emitters.

The schematic diagram of FIG. 9 shows a stereoscopic digital projection system 100 using a common optical path for projection optics 70. The stereoscopic digital projection system includes a red color channel 40r, a green color channel 40g and a blue color channel 40b. Each color channel includes one or more arrays of light sources (e.g., laser array sources) for each of a pair of spectrally-adjacent spectral bands. Light sources 42a emit light beams in the first spectrally-adjacent spectral band, and light sources 42b emit light in the second spectrally-adjacent spectral band. Light-redirecting prisms 30 are used in each color channel to redirect the light beams from the light sources 42a and 42b into a common direction to form a combined light beam including spatially-adjacent light beams for the R1 and R2 spectral bands. The light beams from the first spectrally-adjacent spectral band (e.g., R1) will be grouped on one side of the combined light beam, and the light beams from the second spectrally-adjacent spectral band (e.g., R2) will be grouped on the other side of the combined light beam. One type of light-redirecting prism 30 that can be used for this purpose is described in the aforementioned, commonly-assigned, co-pending U.S. Patent Application Publication 2009/0153752 entitled "Projector using independent multiple wavelength light sources" by Silverstein, which is incorporated herein by reference.

The combined light beam for each component color channel is directed through uniformizing optics 44, beam scanning optics 92 and illumination optics 90, and is reflected from dichroic surface 68 to provide scanned first and second bands of light 36a and 36b onto the corresponding spatial light modulators 60. A controller system 80 (FIG. 5) synchronously modulates the spatial light modulator pixels according to image data for the stereoscopic image, wherein the spatial light modulator pixels illuminated by the first band of light (e.g., R1) are modulated according to image data for the left-eye image and the spatial light modulator pixels illuminated by the second band of light (e.g., R2) are modulated according to image data for the right-eye image.

The modulated imaging light beams provided by the spatial light modulators 60 are transmitted through the dichroic surfaces 68 and are combined onto a common optical axis using a dichroic combiner 82 having multiple dichroic surfaces 84. The combined light beam is projected onto a display surface (not shown) using the projection optics 70 for viewing by observers wearing viewing glasses 74 (FIG. 5).

The embodiment illustrated in FIG. 9 uses three spatial light modulators 60, one for each component color channel (i.e., red, green and blue). Each spatial light modulator 60 is illuminated with scrolling bands of light having spectrally-adjacent spectral bands within a particular component color channel. The spatial light modulators tend to be one of the more expensive and complex components of the stereoscopic digital projection system 100.

Figure 10:
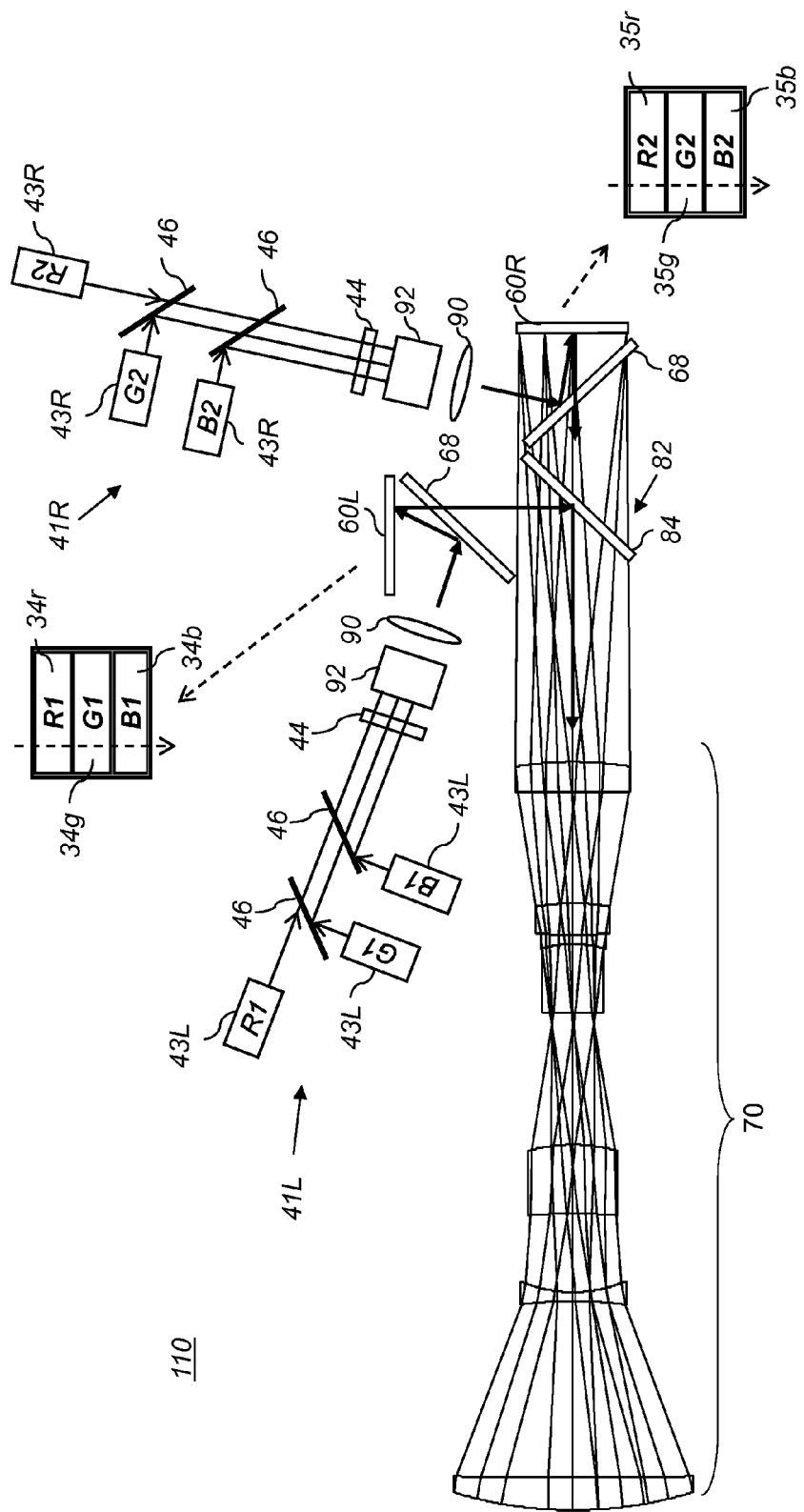
FIG. 10 is a schematic diagram of a stereoscopic color scrolling digital projection system having three color channels according to an alternate embodiment using two spatial light modulators.

FIG. 10 illustrates a schematic diagram for an alternate embodiment of a stereoscopic digital projection system 110 that utilizes only two spatial light modulators 60L and 60R, one associated with a left-eye image forming system 41L and one associated with a right-eye image forming system 41R. The left-eye image forming system 41L includes three left-eye light sources 43L, one for each component color spectrum (R1, G1 and B1). Similarly, the right-eye image forming system 41R includes three right-eye light sources 43R, one for each component color spectrum (R2, G2 and B2). The right-eye light sources 43R are spectrally-adjacent to the corresponding left-eye light sources 43L.

Each of the image forming systems include uniformizing optics 44, beam scanning optics 92, illumination optics 90 and a dichroic surface 68 to direct the scanned beams of light onto spatial light modulators 60L and 60R. In this case, the left-eye image forming system 41L provides three scanned bands of light 34r, 34g and 34b, corresponding to the red, green and blue spectral bands (R1, G1 and B1), respectively. Likewise, the right-eye image forming system 41R provides three scanned bands of light 35r, 35g and 35b, corresponding to the red, green and blue spectral bands (R2, G2 and B2), respectively.

A controller system (not shown) synchronously modulates the pixels of the spatial light modulator 60L in the left-eye image forming system 41L according to image data for the left-eye image, wherein the pixels illuminated by the each band of light (R1, G1 and B1) are modulated according to the image data for the corresponding color channel of the left-eye image. Likewise, the controller system synchronously modulates the pixels of the spatial light modulator 60R in the right-eye image forming system 41R according to image data for the right-eye image, wherein the pixels illuminated by the each band of light (R2, G2 and B2) are modulated according to the image data for the corresponding color channel of the left-eye image.

A dichroic combiner 82 including a dichroic surface 84 is used to combine the imaging light from the left-eye image forming system 41L and the right-eye image forming system 41R onto a common optical axis for projection onto a display surface using projection optics 70. The dichroic surface 84 is preferably a spectral comb filter having a series of notches that transmits the spectral bands (R2, G2 and B2) corresponding to the imaging light for the right-eye light sources 43R while reflecting the spectral bands (R1, G1 and B1) corresponding to the imaging light for the left-eye light sources 43L. As discussed earlier, spectral comb filters can be fabricated using any technique known in the art, such as multi-layer thin-film coating methods and co-extruded stretched polymer film structure fabrication methods. Another type of dichroic filter that can be used to provide a spectral comb filter for use as dichroic surface 84 is a rugate filter design. Rugate filters are interference filters that have deep, narrow rejection bands while also providing high, flat transmission for the rest of the spectrum. Rugate filters are fabricated using a manufacturing process that yields a continuously varying index of refraction throughout an optical film layer. Rugate filters feature low ripple and no harmonic reflections compared to standard notch filters, which are made with discrete layers of materials with different indices of refraction.

Figure 11:
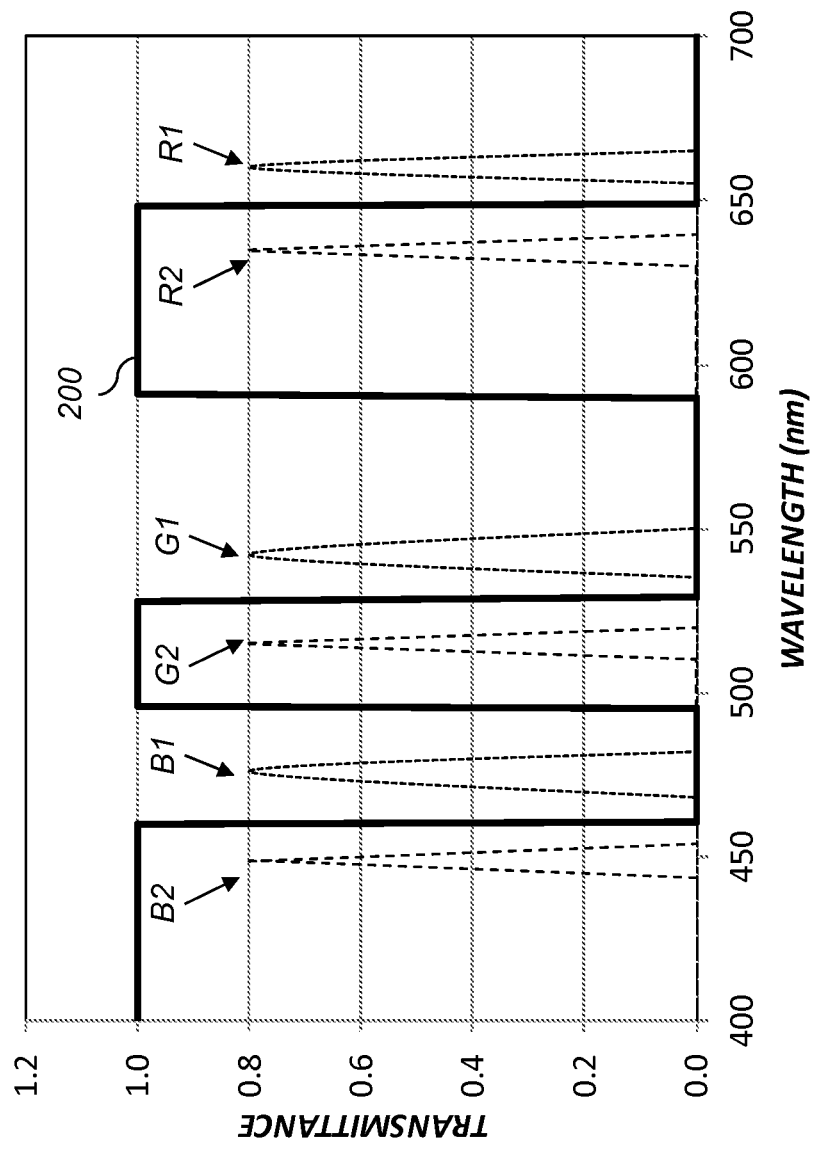
FIG. 11 shows a plot of spectral transmittance for an example comb filter that can be used for the dichroic combiner of FIG. 10.

FIG. 11 shows a spectral transmittance plot 200 representing the spectral transmittance as a function of wavelength for an idealized spectral comb filter that can be used for the dichroic surface 84 of FIG. 10. The spectral comb filter has a series of notches that transmit the spectral bands (R2, G2 and B2) corresponding to the imaging light for the right-eye light sources 43R (FIG. 10) while reflecting the spectral bands (R1, G1 and B1) corresponding to the imaging light for the left-eye light sources 43L (FIG. 10). In this example, the spectral bands for the left-eye light sources 43L (R1, G1 and B1) and the right-eye light sources 43R (R2, G2 and B2) correspond to the spectrally-adjacent spectral bands given earlier in Table 1. Note that wherever the transmittance is low in the spectral transmittance plot 200 the corresponding spectral reflectance would be high and vice versa. (Ideally, the sum of the reflectance and transmittance will be 1.0 at each wavelength, although in practice some light will also be absorbed.) Real filters will not be perfectly transmitting or reflecting at any given wavelength as shown in the idealized spectral transmittance plot 200, nor will the notches have perfectly sharp edges. However, real filters can be designed and fabricated that can come sufficiently close to the idealized function shown here so that performance is not significantly affected.

Figure 12A:
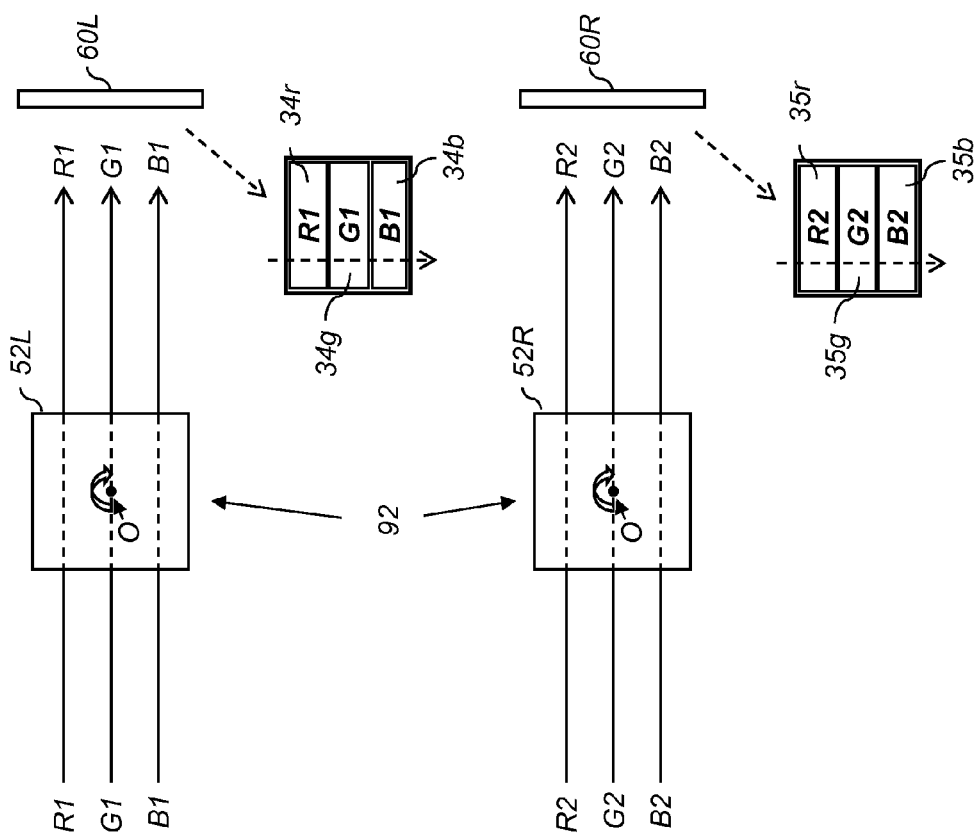
FIG. 12A is a schematic diagram that shows the use of rotating prisms, each scanning three bands of color associated with left-eye and right-eye image forming systems.

FIG. 12A shows one embodiment of the beam scanning optics 92 wherein rotating prisms 52L and 52R are provided for each of the image forming systems in the configuration of FIG. 10. In this case, the light beams from the left-eye light sources (R1, G1 and B1) are incident on the rotating prism 52L in three parallel light beams, and are provided onto spatial light modulator 60L as scanning bands of light 34r, 34g and 34b. Likewise, the light beams from the right-eye light sources (R2, G2 and B2) are incident on the rotating prism 52R in three parallel light beams, and are provided onto spatial light modulator 60L as scanning bands of light 34r, 34g and 34b.

Figure 12B:
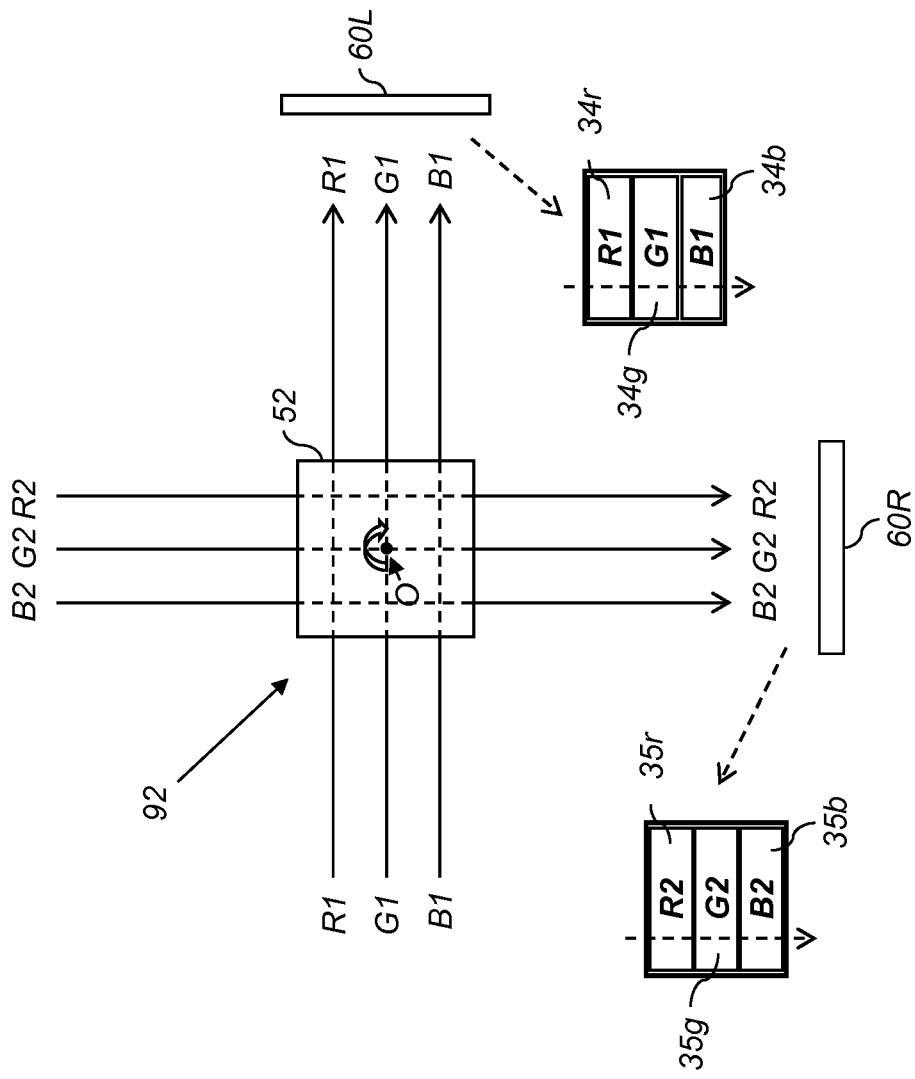
FIG. 12B is a schematic diagram that shows the use of a single rotating prism to scan three bands of color for each of the left-eye and right-eye image forming systems.

FIG. 12B shows an alternate embodiment wherein the beam scanning optics 92 include a single prism 52, which is used to simultaneously scan the bands of light for the left-eye image forming system 41L (FIG. 10) and the right-eye image forming system 41R (FIG. 10). In this case, the light beams from the left-eye light sources (R1, G1 and B1) are incident on the rotating prism 52 in three parallel light beams in a first direction, and are provided onto the spatial light modulator 60L as scanning bands of light 34r, 34g and 34b. The light beams from the right-eye light sources (R2, G2 and B2) are directed onto the rotating prism 52 in three parallel light beams combing from a direction that is substantially perpendicular to the direction of the light beams from the left-eye light sources, and are provided onto spatial light modulator 60R as scanning bands of light 35r, 35g and 35b. This configuration has the advantage that only a single rotating prism 52 is required. This reduces the system cost. Additionally, it simplifies the system since it is not necessary to synchronize the rotation of two prisms.

It should be noted that the single prism configuration of FIG. 12B can be combined with the multi-angle configuration of FIG. 6C. In this case, the light beams from the left-eye light sources (R1, G1 and B1) would be incident on the rotating prism 52 from different directions rather than as parallel beams. Likewise, the light beams from the right-eye light sources (R2, G2 and B2) would be incident on the rotating prism 52 from different directions as well. Dichroic combiners 82 (FIG. 6C) can then be used to combine the scanned light beams from each of the image forming systems onto parallel optical axes.

The invention has been described in detail with particular reference to certain preferred embodiments thereof, but it will be understood that variations and modifications can be effected within the spirit and scope of the invention. For example, light sources could be of various types and can include arrays of lasers or other emissive devices combined onto the same optical axis using prisms or other combining optics. Optical systems, typically represented by a lens or a block in the schematic drawings provided, could include any number of optical components needed to guide and condition the illumination or imaged light. Spatial light modulator 60 in each color channel can be any of a number of different types of spatial light modulator, such as a Digital Light Processor from Texas Instruments, Dallas, Tex., a type of digital micromirror array, or a liquid crystal array, for example. Additional filtering can be provided in the illumination path to attenuate spectral content from one or more light sources so that the adjacent spectral bands are substantially non-overlapping.

Thus, what is provided is an apparatus and method using scrolling color bands for forming the separate left- and right-eye images for a stereoscopic image, wherein the component spectral bands for each eye are spectrally-adjacent.

| PARTS LIST | |
|---|---|
| 12 | light source |
| 18 | optics |
| 20 | spatial light modulator |
| 28a | image frame |
| 28b | image frame |
| 28c | image frame |
| 28d | image frame |
| 28e | image frame |
| 30 | light redirecting prism |
| 32 | image region |
| 34b | band of light |
| 34g | band of light |
| 34r | band of light |
| 35b | band of light |
| 35g | band of light |
| 35r | band of light |
| 36a | band of light |
| 36b | band of light |
| 38 | image frame |
| 38a | image frame |
| 38b | image frame |
| 38c | image frame |
| 38d | image frame |
| 38e | image frame |
| 40r | red color channel |
| 40g | green color channel |
| 40b | blue color channel |
| 41L | left-eye image forming system |
| 41R | right-eye image forming system |
| 42a | light source |
| 42b | light source |
| 43L | left-eye light source |
| 43R | right-eye light source |
| 44 | uniformizing optics |
| 46 | beam combiner |
| 48 | lens |
| 50 | beam scanner |
| 52 | prism |
| 52L | prism |
| 52R | prism |
| 54 | lenslet array |
| 56 | block |
| 58 | integrating bar |
| 60 | spatial light modulator |
| 60L | spatial light modulator |

-continued

PARTS LIST

| | |
|---|---|
| 60R | spatial light modulator |
| 68 | dichroic surface |
| 70 | projection optics |
| 72 | display surface |
| 74 | viewing glasses |
| 76L | filter |
| 76R | filter |
| 80 | controller system |
| 82 | dichroic combiner |
| 84 | dichroic surface |
| 90 | illumination optics |
| 92 | beam scanning optics |
| 94 | first stage |
| 96 | second stage |
| 98 | intermediate image plane |
| 100 | stereoscopic digital projection system |
| 110 | stereoscopic digital projection system |
| 200 | spectral transmittance plot |
| A1 | light source area |
| A2 | modulator area |
| B1 | spectral band |
| B2 | spectral band |
| G1 | spectral band |
| G2 | spectral band |
| O | axis |
| R1 | spectral band |
| R2 | spectral band |
| θ1 | output angle |
| θ2 | acceptance angle |

The invention claimed is:

1. A color stereoscopic digital projection system having a plurality of color channels for projecting a color stereoscopic image including a left-eye image and a right-eye image, comprising:
a left-eye image forming system including:
a plurality of left-eye light sources, each providing a light beam having a different spectral band corresponding to a different color channel, the spectral bands falling within either a red color spectrum, a green color spectrum or a blue color spectrum;
a first spatial light modulator having an array of pixels that can be modulated according to image data to provide imaging light;
illumination optics arranged to receive the light beams for the left-eye light sources and provide corresponding substantially uniform bands of light;
beam scanning optics arranged to cyclically scroll the bands of light for the left-eye light sources across the first spatial light modulator such that the bands of light are substantially non-overlapping; and
a controller system that synchronously modulates the pixels of the first spatial light modulator according to image data for the left-eye image, wherein the pixels illuminated by the each band of light are modulated according to the image data for the corresponding color channel of the left-eye image;
a right-eye image forming system including:
a plurality of right-eye light sources, each providing a light beam having a different spectral band corresponding to a different color channel, the spectral bands falling within either a red color spectrum, a green color spectrum or a blue color spectrum, wherein each of the right-eye light sources corresponds to one of the left-eye light sources, and wherein the corresponding right-eye and left-eye light sources have spectrally-adjacent, substantially non-overlapping spectral bands, both spectral bands falling within the same red color spectrum, the green color spectrum or the blue color spectrum;
a second spatial light modulator having an array of pixels that can be modulated according to image data to provide imaging light;
illumination optics arranged to receive the light beams for the right-eye light sources and provide corresponding substantially uniform bands of light;
beam scanning optics arranged to cyclically scroll the bands of light for the right-eye light sources across the second spatial light modulator such that the bands of light are substantially non-overlapping; and
a controller system that synchronously modulates the pixels of the second spatial light modulator according to image data for the right-eye image, wherein the pixels illuminated by the each band of light are modulated according to the image data for the corresponding color channel of the right-eye image;
beam combining optics that combine the imaging light from the left-eye and right-eye image forming systems onto a common optical axis, wherein the beam combining optics includes one or more dichroic filters arranged to selectively transmit the spectral bands from one of the image forming systems and selectively reflect the spectral bands from the other image forming system;
projection optics for delivering the combined imaging light to a display surface; and
filter glasses for a viewer having left-eye and right-eye filters that selectively transmit light in the spectral bands of the left-eye light sources to the viewer's left eye and selectively transmit light in the spectral bands of the right-eye light sources to the viewer's right eye.

2. The stereoscopic digital projection system of claim 1 wherein the beam combining optics include a dichroic filter that is a spectral comb filter.

3. The color stereoscopic digital projection system of claim 1 wherein the beam combining optics include a dichroic filter that includes an optical surface having a multi-layer thin-film coating.

4. The color stereoscopic digital projection system of claim 1 wherein the beam combining optics include a dichroic filter that includes a multi-layer stretched polymeric film structure.

5. The color stereoscopic digital projection system of claim 1 wherein the beam combining optics include a dichroic filter that includes a rugate filter structure.

6. The color stereoscopic digital projection system of claim 5 wherein the motion of the moving optical element is a rotating, translating, reciprocating or pivoting motion.

7. The color stereoscopic digital projection system of claim 5 wherein the moving optical element is a prism, mirror or lens.

8. The color stereoscopic digital projection system of claim 1 wherein the beam scanning optics for each image forming system include at least one moving optical element.

9. The color stereoscopic digital projection system of claim 1 wherein the beam scanning optics for at least one of the image forming systems includes:
a plurality of moving optical elements, each arranged to scroll a corresponding band of light; and
a dichroic beam combiner to combine the scrolling bands of light onto parallel optical axes.

10. The color stereoscopic digital projection system of claim 1 wherein the beam scanning optics for at least one of the image forming systems include:
a moving optical element; and
beam directing optics to direct the plurality of bands of light onto parallel optical axes, providing spatially-adjacent bands of light, and to direct the spatially-adjacent bands of light onto the moving optical element, thereby providing a corresponding plurality of scrolled bands of light.

11. The color stereoscopic digital projection system of claim 1 wherein the beam scanning optics for at least one of the image forming systems include:
   a moving optical element;
   beam directing optics to direct the plurality of light beams onto non-parallel optical axes, providing a corresponding plurality of non-parallel light beams, wherein the non-parallel light beams are all directed onto the moving optical element, thereby providing a corresponding plurality of scrolled light beams; and
   beam combining optics that combine the plurality scrolled light beams onto parallel optical axes, thereby providing a corresponding plurality of scrolled bands of light.

12. The color stereoscopic digital projection system of claim 1 wherein the beam scanning optics for the left-eye and right-eye image forming systems include at least one moving optical element that is common to both image forming systems.

13. The color stereoscopic digital projection system of claim 1 wherein the illumination optics for each of the image forming systems include uniformizing optics that provide substantially uniform light beams for each of the corresponding left-eye or right-eye light sources.

14. The color stereoscopic digital projection system of claim 13 wherein the uniformizing optics include an integrating bar or a lenslet array.

15. The color stereoscopic digital projection system of claim 1 wherein each of the left-eye and right-eye light sources are independent light sources.

16. The color stereoscopic digital projection system of claim 1 wherein the left-eye and right-eye light sources are narrow-band light sources having a spectral bandwidth of less than 10 nm.

17. The color stereoscopic digital projection system of claim 1 wherein the left-eye and right-eye light sources are laser light sources, LED light sources or quantum dot light sources.

18. The color stereoscopic digital projection system of claim 1 wherein the left-eye and right-eye filters are dichroic spectral comb filters.

19. The color stereoscopic digital projection system of claim 18 wherein the dichroic spectral comb filters include an optical surface having a multi-layer thin-film coating.

20. The color stereoscopic digital projection system of claim 18 wherein the dichroic spectral comb filters include a multi-layer stretched polymeric film structure.

* * * * *